(12) United States Patent
Oetken

(10) Patent No.: US 10,803,174 B2
(45) Date of Patent: Oct. 13, 2020

(54) BIT-LEVEL DATA GENERATION AND ARTIFICIAL INTELLIGENCE TECHNIQUES AND ARCHITECTURES FOR DATA PROTECTION

(71) Applicant: Quantum Star Technologies LLC, Coeur d'Alene, ID (US)

(72) Inventor: Garrett Thomas Oetken, Post Falls, ID (US)

(73) Assignee: Quantum Star Technologies LLC, Coeur d'Alene, ID (US)

( * ) Notice: Subject to any disclaimer, the term of this patent is extended or adjusted under 35 U.S.C. 154(b) by 0 days.

(21) Appl. No.: 16/569,978

(22) Filed: Sep. 13, 2019

(65) Prior Publication Data

US 2020/0089886 A1    Mar. 19, 2020

Related U.S. Application Data

(60) Provisional application No. 62/731,825, filed on Sep. 15, 2018.

(51) Int. Cl.
| | |
|---|---|
| *G06F 16/21* | (2019.01) |
| *G06F 21/56* | (2013.01) |
| *G06N 3/08* | (2006.01) |
| *H04L 29/06* | (2006.01) |

(52) U.S. Cl.
CPC .......... *G06F 21/567* (2013.01); *G06F 16/212* (2019.01); *G06F 21/565* (2013.01); *G06N 3/08* (2013.01); *H04L 63/1425* (2013.01); *G06F 2221/034* (2013.01)

(58) Field of Classification Search
USPC .......... 726/2, 21, 23, 36; 713/150, 163, 181; 380/255, 264, 276
See application file for complete search history.

(56) References Cited

U.S. PATENT DOCUMENTS

| | | | |
|---|---|---|---|
| 7,593,013 B2 | 9/2009 | Agutter et al. | |
| 8,151,352 B1 * | 4/2012 | Novitchi | ............. G06F 9/45508 717/138 |
| 8,533,581 B2 | 9/2013 | Krall et al. | |
| 8,701,192 B1 * | 4/2014 | Glick | .................... G06F 21/566 726/24 |

(Continued)

OTHER PUBLICATIONS

International Search Report dated Nov. 15, 2019 for PCT/US2019/051196, 2 pages.

(Continued)

*Primary Examiner* — Sharif E Ullah
(74) *Attorney, Agent, or Firm* — Chang & Hale LLP

(57) ABSTRACT

Techniques and architectures for representing data with one or more n-dimensional representations and/or using one or more models to identify threats associated with the one or more n-dimensional representations are described herein. For example, the techniques and architectures may determine one or more coordinates for one or more points based on one or more sets of bits in the data and generate an n-dimensional representation for the data based on the one or more points. The techniques and architectures may evaluate the n-dimensional representation with one or more machine-trained models to detect a threat associated with the data, such as malware or another threat.

20 Claims, 6 Drawing Sheets

(56) References Cited

U.S. PATENT DOCUMENTS

| | | | |
|---|---|---|---|
| 9,104,870 B1* | 8/2015 | Qu | G06F 21/563 |
| 9,332,028 B2 | 5/2016 | Xaypanya et al. | |
| 9,525,696 B2* | 12/2016 | Kapoor | H04L 63/1425 |
| 9,588,872 B2 | 3/2017 | Revanna et al. | |
| 9,690,938 B1* | 6/2017 | Saxe | G06F 21/563 |
| 9,712,532 B2 | 7/2017 | Krall et al. | |
| 9,910,986 B1 | 3/2018 | Saxe et al. | |
| 10,218,718 B2* | 2/2019 | Kopp | H04L 63/1416 |
| 10,303,875 B1 | 5/2019 | Saxe et al. | |
| 10,601,783 B2* | 3/2020 | Ickes | H04L 63/0281 |
| 2007/0188494 A1* | 8/2007 | Agutter | G06F 16/248 345/440 |
| 2009/0267946 A1 | 10/2009 | Agutter et al. | |
| 2011/0041179 A1* | 2/2011 | St Hlberg | G06F 21/566 726/23 |
| 2011/0283174 A1* | 11/2011 | M'Raihi | H04L 61/1511 715/205 |
| 2012/0246171 A1* | 9/2012 | Teerlink | G06F 16/14 707/748 |
| 2013/0269042 A1 | 10/2013 | Krall et al. | |
| 2014/0215621 A1* | 7/2014 | Xaypanya | H04L 63/145 726/23 |
| 2015/0319182 A1* | 11/2015 | Natarajan | H04L 63/145 726/24 |
| 2016/0246701 A1* | 8/2016 | Revanna | G06F 11/3636 |
| 2017/0169208 A1* | 6/2017 | Jantz | G06N 3/0454 |
| 2017/0264619 A1* | 9/2017 | Narayanaswamy | G06F 16/285 |
| 2018/0247682 A1* | 8/2018 | Gajapathy | G11C 7/1018 |
| 2019/0042743 A1* | 2/2019 | Chen | G06F 21/563 |
| 2019/0054347 A1* | 2/2019 | Saigh | A63B 24/0062 |
| 2019/0065563 A1* | 2/2019 | Petculescu | G06F 16/248 |
| 2019/0199736 A1* | 6/2019 | Howard | G06F 21/566 |
| 2019/0260795 A1* | 8/2019 | Araiza | H04L 63/0428 |
| 2019/0272375 A1* | 9/2019 | Chen | G06N 3/08 |
| 2019/0342324 A1* | 11/2019 | Nawy | G06F 16/2228 |
| 2020/0045063 A1* | 2/2020 | Zhang | G06N 3/08 |

OTHER PUBLICATIONS

Written Opinion of ISA dated Nov. 15, 2019 for PCT/US2019/051196, 6 pages.

Moser et al, "Limits of Static Analysis for Malware Detections", The Twenty-Third Annual Computer Security Applications Conference (ACSAC 2007), Dec. 14, 2007, 11 pages.

Z3ROTRUST, "Digital Steganography as an Advanced Malware Detection Evasion Technique", Aug. 30, 2018, 49 pages.

Notification of Transmittal of the International Search Report and the Written Opinion of the International Searching Authority for PCT/US2019/051196, dated Nov. 15, 2019, 1 page.

Li Chen et al., Stamina: Scalable Deep Learning Approach for Malware Classification, Apr. 2020 [online], 11 pages, [retrieved on May 15, 2020]. Retrieved from the Internet: <URL: https://www.intel.com/content/www/us/en/artificial-intelligence/documents/stamina-deep-learning-for-malware-protection-whitepaper.html >.

* cited by examiner

BIT-LEVEL DATA GENERATION AND ARTIFICIAL INTELLIGENCE TECHNIQUES AND ARCHITECTURES FOR DATA PROTECTION

CROSS-REFERENCE TO RELATED APPLICATIONS

This application claims priority to U.S. Provisional Application No. 62/731,825, filed Sep. 15, 2018, and entitled "Process to Parse Binary Data as N-Dimensional Coordinate Sets for Neural Network Analysis and Training," the entire contents of which are incorporated herein by reference.

BACKGROUND

Anti-malware tools are implemented to prevent, detect, and remove malware that threatens computing devices. These tools use pattern matching, heuristic analysis, behavioral analysis, or hash matching to identify malware. Although these techniques provide some level of security, the anti-malware tools are slow to adapt to changing malware, reliant on humans to flag or verify malware, slow to process data, and require exact matches between data and pre-flagged malware. This often leaves computing devices exposed to malware for relatively long periods of time, causing various undesirable issues.

BRIEF DESCRIPTION OF THE DRAWINGS

Various embodiments are depicted in the accompanying drawings for illustrative purposes and should in no way be interpreted as limiting the scope of the disclosure. In addition, various features of different disclosed embodiments can be combined to form additional embodiments, which are part of this disclosure. In the figures, the left-most digit(s) of a reference number identifies the figure in which the reference number first appears. Throughout the drawings, reference numbers may be reused to indicate correspondence between reference elements.

DETAILED DESCRIPTION

Figure 1:
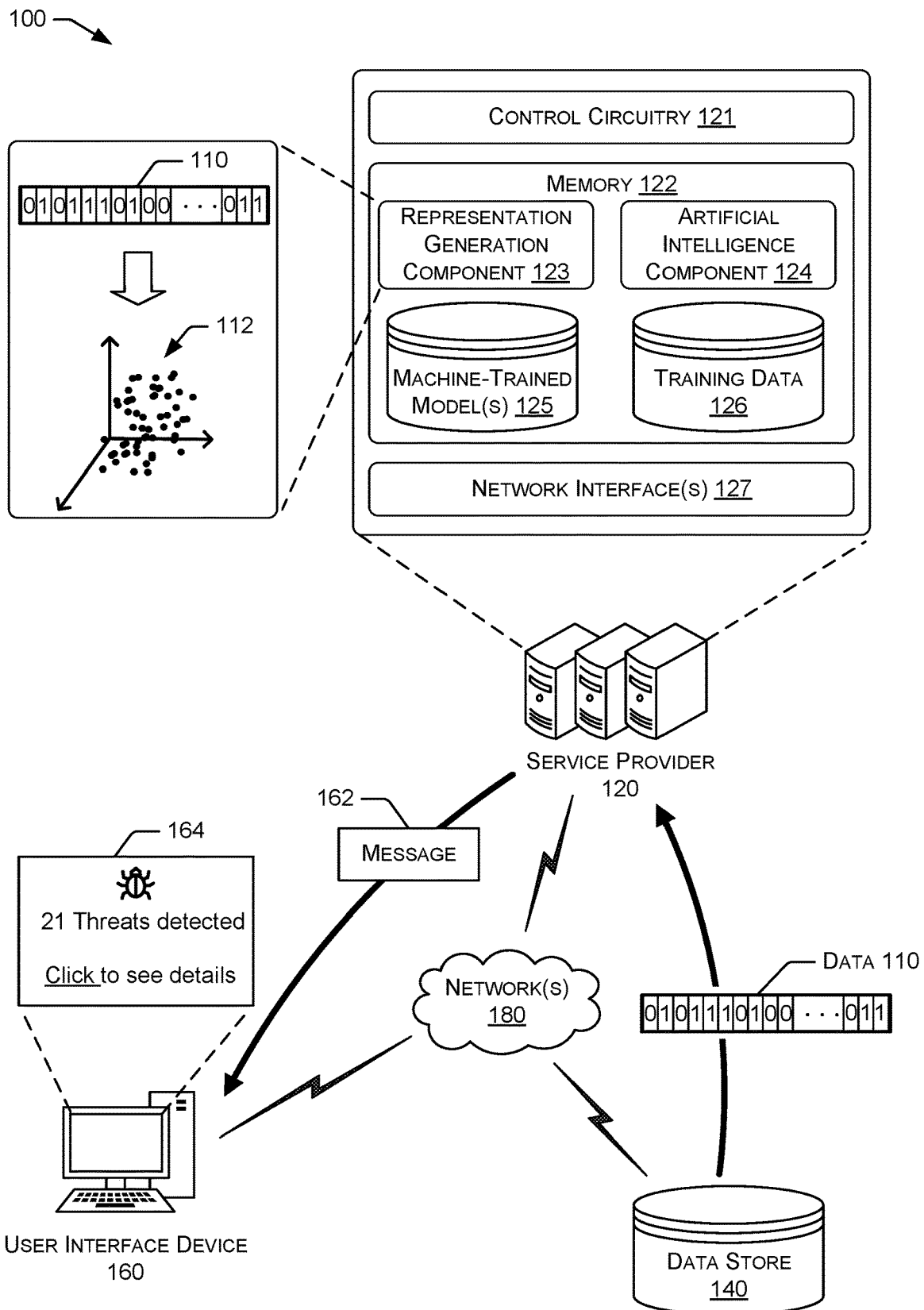
FIG. 1 illustrates an example architecture in which the techniques described herein may be implemented.

This disclosure describes techniques and architectures for representing data with one or more n-dimensional representations and using one or more models to identify threats associated with the one or more n-dimensional representations. For example, the techniques and architectures may receive data of any type and process the data at a bit or byte level to generate an n-dimensional representation of the data. To generate such representation, the techniques and architectures may represent groups of bits within the data as points with a coordinate system, with a set of bits within a group of bits representing a coordinate for a point. The techniques and architectures may use the points as the n-dimensional representation (e.g., a point cloud) and/or generate the n-dimensional representation based on the points, such as by generating a two- or three-dimensional model, two- or three-dimensional wire-frame, or another representation of any dimension. The techniques and architectures may evaluate the n-dimensional representation with one or more machine-trained models (e.g., one or more artificial neural networks) to detect a threat associated with the data, such as malware or another threat. The one or more machine-trained models may have been trained using machine learning to identify threats within n-dimensional representations. If a threat is detected, various operations may be performed, such as removing the threat, ensuring that the threat is not associated with the data, providing a notification regarding the threat, or another operation.

The techniques and architectures discussed herein may provide various security measures to efficiently and/or accurately detect threats to data. For example, the techniques and architectures may represent data in an n-dimensional representation and process the n-dimensional representation with a machine-trained model that efficiently and/or accurately detects various types of threats to the data, such as malware or other threats. In some embodiments, since the techniques and architectures operate at a bit or byte level to generate a representation of the data, any type of data may be processed (e.g., the techniques and architectures are agnostic to data type, environment type, etc.). For example, the techniques and architectures may be implemented for various types of data, such as file system data, network traffic data, runtime data, non-image-based data, data stored in volatile memory, data stored in non-volatile memory, behavioral data, and so on, and/or implemented for various environments, such as different operating systems, platforms, and so on. Moreover, in some embodiments, the techniques and architectures may detect threats by processing just a portion of data (e.g., a portion of a file, etc.), which may further increase the efficiency of the techniques and architectures. Furthermore, in some embodiments, the techniques and architectures may detect threats without human involvement.

Although many embodiments and examples are discussed herein in the context of two- or three-dimensional representations for ease of discussion and illustration, the techniques and architectures may be implemented on a representation of any number of dimensions. That is, an n-dimensional representation may comprise a one-dimensional representation, a two-dimensional representation, a three-dimensional representation, a four-dimensional representation, and so on. Further, although some embodiments and examples are discussed herein in the context of cybersecurity, the techniques and architectures can be implemented within a wide variety of contexts, such as industrial control systems, network traffic, physical security, system memory, isolated environments, and so on.

Moreover, although certain embodiments and examples are disclosed herein, the disclosure extends beyond the specifically disclosed embodiments to other alternative embodiments and/or uses, and to modifications and equivalents thereof. Thus, the scope of the claims that may arise here from is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as described herein without necessarily achieving other aspects or advantages as may also be described or suggested herein.

FIG. 1 illustrates an example architecture 100 in which the techniques described herein may be implemented. The architecture 100 includes a service provider 120 configured to evaluate data to detect any threats that may be associated with the data. For example, the service provider 120 may be configured to receive data 110 from a data store 140, process the data 110 to generate an n-dimensional representation 112, evaluate the n-dimensional representation 112 to identify any threats associated with the data 110, and/or perform a variety of other operations. In some embodiments, the service provider 120 is configured to communicate with a user interface device 160 to facilitate an evaluation of data. For example, a user (not illustrated) may employ the user interface device 160 to initiate an evaluation of data and the service provider 120 may provide a message 162 back to the user interface device 160 regarding the evaluation, such as information indicating whether or not a threat was detected, a type of threat detected, and so on. However, in other examples a user and/or the user interface device 160 may not initiate an evaluation of data (e.g., the service provider 120 may perform an evaluation without a request from the user interface device 160). In some embodiments, such as that illustrated in FIG. 1, the user interface device 160 provides a user interface (e.g., a Graphical User Interface (GUI)) to receive input and/or provide output.

A threat may include malware, phishing, a rootkit, a bootkit, a logic bomb, a backdoor, a screen scraper, a physical threat (e.g., an access point without security measures, such as leaving a door open, etc.), and so on. Malware may include a virus, spyware, adware, a worm, a Trojan horse, scareware, ransomware, and so on. In some embodiments, a threat may result from any data, software, or other component that has malicious intent.

The service provider 120 may be implemented as one or more computing devices, such as one or more servers, one or more desktop computers, one or more laptops computers, or any other type of device configured to process data. In some embodiments, the one or more computing devices are configured in a cluster, data center, cloud computing environment, or a combination thereof. In some embodiments, the one or more computing devices of the service provider 120 are implemented as a remote computing resource that is located remotely to the user interface device 160 and/or the data store 140. In other embodiments, the one or more computing devices of the service provider 120 are implemented as local resources that are located locally at the user interface device 160 and/or the data store 140. As illustrated, the service provider 120 can include control circuitry 121, memory 122, and one or more network interfaces 127.

The control circuitry 121 may include one or more processors, such as one or more central processing units (CPUs), one or more microprocessors, one or more graphics processing units (GPUs), one or more digital signal processors (DSPs), etc. Alternatively, or additionally, the control circuitry 121 may include one or more application specific integrated circuits (ASIC), one or more field-programmable gate arrays (FPGAs), one or more program-specific standard products (ASSPs), one or more complex programmable logic devices (CPLDs), and/or the like.

The memory 122 (as well as any other memory discussed herein) may include any suitable or desirable type of computer-readable media. For example, computer-readable media may include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other data types. Computer-readable media that may be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EE-PROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that may be used to store information for access by a computing device. As used in certain contexts herein, computer-readable media may not generally refer to communication media, such as modulated data signals and carrier waves. As such, computer-readable media should generally be understood to refer to non-transitory media.

The memory 122 may store a representation generation component 123, an Artificial Intelligence (AI) component 124, one or more machine-trained models within a data store 125, and/or training data within a data store 126. The representation generation component 123 and/or the AI component 124 can include executable instructions that, when executed by the control circuitry 121, cause the control circuitry 121 to perform various operations discussed herein. For example, the representation generation component 123 and/or the AI component 124 may include software/firmware modules. However, the representation generation component 123 and/or the AI component 124 may be implemented as one or more hardware logic components, such as one or more application specific integrated circuits (ASIC), one or more field-programmable gate arrays (FPGAs), one or more program-specific standard products (ASSPs), one or more complex programmable logic devices (CPLDs), and/or the like. For ease of discussion, the representation generation component 123 and the AI component 124 are illustrated as separate components. However, it should be understood that the representation generation component 123 and the AI component 124 may be implemented as any number of components to implement the functionality discussed herein (e.g., combined or separated into additional components).

The representation generation component 123 may generally be configured to process data to generate an n-dimensional representation of the data. For example, the representation generation component 123 may retrieve the data 110 from the data store 140 and/or a data store associated with the service provider 120. The representation generation component 123 may then process (e.g., parse) the data 110 in groups of bits to determine points for a coordinate system.

Each group of bits may include one or more sets of bits that represent one or more coordinates, respectively. For example, the representation generation component 123 may extract three bytes of data (i.e., a group of bits) and represent each byte (i.e., set of bits) with a coordinate for a point. In particular, the representation generation component 123 can convert each byte into a coordinate value for a coordinate system (e.g., a value from 0 to 255). For instance, a first byte in a group of bits may represent an x-coordinate (e.g., x-value from 0 to 255 on a coordinate system), a second byte in the group of bits may represent a y-coordinate for the point (e.g., y-value from 0 to 255 on the coordinate system), and a third byte in the group of bits may represent z-coordinate for the point (e.g., z-value from 0 to 255 on the coordinate system). The representation generation component 123 may process any number of bits in the data 110 to determine any number of points for the data 110. Although some examples are discussed herein in the context of three bytes representing a group of bits and a byte representing a set of bits, a group of bits and/or a set of bits may include any number of bits or bytes.

The representation generation component 123 may generate an n-dimensional representation, such as the n-dimensional representation 112, based on coordinates of points. For example, the representation generation component 123 can position each point within a coordinate system using one or more coordinates for the point (e.g., position a point based on a x-coordinate value, y-coordinate value, and z-coordinate value). In some embodiments, the points produced by such process form an n-dimensional representation (e.g., a point cloud). Further, in some embodiments, the points produced by such process may be used to form an n-dimensional representation. Here, the representation generation component 123 may generate an n-dimensional map, an n-dimensional model, an n-dimensional wireframe, and so on, based on the points. In some embodiments, the data 110 includes a plurality of units of data, such as a plurality of files, and the representation generation component 123 generates an n-dimensional representation for each of the units of data. An example process of generating an n-dimensional representation is illustrated and discussed in reference to FIG. 3.

An n-dimensional representation, such as the n-dimensional representation 112, may include a variety of representations, such as an n-dimensional point cloud, an n-dimensional map, an n-dimensional model (e.g., surface model, solid model, etc.), a n-dimensional wireframe, and so on. The term "n" may represent any integer. In some embodiments, an n-dimensional representation may include surfaces. In some embodiments, an n-dimensional representation may be visualized by a human, while in other embodiments an n-dimensional representation may not able to be visualized by a human. In some embodiments, data representing an n-dimensional representation (e.g., coordinates of points, surfaces, etc.) may be stored in an array, matrix, list, or any other data structure. An n-dimensional representation may be represented within a coordinate system. A coordinate system may include a number line, a cartesian coordinate system, a polar coordinate system, a homogeneous coordinate system, a cylindrical or spherical coordinate system, etc. As noted above, although many examples are discussed herein in the context of two- or three-dimensional representations represented in two- or three-dimensional coordinate systems, the techniques and architectures may generate a representation of any number of dimensions and/or a representation may be represented in any type of coordinate system.

In some embodiments, the representation generation component 123 generates multiple representations for the same data (e.g., a unit of data, such as a file). In some examples, the representation generation component 123 may generate a two-dimensional representation for data and generate a three-dimensional representation for the same data. Further, in some examples, the representation generation component 123 may generate a three-dimensional representation for data using a process that represents three bytes of continuous bits as an x-coordinate, a y-coordinate, and a z-coordinate, in that order. The representation generation component 123 may also generate a three-dimensional representation for the same data using a process that represents three bytes of continuous bits as a y-coordinate, a z-coordinate, and an x-coordinate, in that order. In any event, representing data with multiple representations may be useful to provide multiple layers of evaluation of the data (e.g., when evaluating the data with the AI component 124 to detect any threats). As such, the representation generation component 123 may generate multiple representations for data using different coordinate systems and/or different manners of processing the data.

In some embodiments, the representation generation component 123 processes a portion of data while refraining from processing another portion of the data. For example, the representation generation component 123 may process a predetermined number of bytes of each file, such as a first 1500 bytes of each file, a second 1500 bytes of each file, or a last 1500 bytes of each file, to generate an n-dimensional representation for the file. In some embodiments, an initial portion of data (e.g., a file) may include a header that designates execution points within the data. In cases where malware or other threats are associated with a header and/or execution points, which may frequently be the case, the representation generation component 123 may efficiently process data by generating an n-dimensional representation based on just the data within the header.

In some embodiments, the representation generation component 123 may determine a type of data and process a portion of the data based on the type of data. For example, it may be determined through machine learning or other techniques that evaluating a particular section of data (e.g., a header, a footer, a section of a payload, etc.) for a particular type of data (e.g., file system data, network traffic data, runtime data, etc.) accurately detects any threats associated with the type of data by more than a threshold (e.g., 99% of the time). As such, the representation generation component 123 may be configured to process the particular section within each piece of data (e.g., file) and refrain from processing other sections of the piece of data.

The data 110 may be a variety of types of data, such as audio data, video data, text data (e.g., text files, email, etc.), binary data (e.g., binary files), image data, network traffic data (e.g., data protocol units exchanged over a network, such as segments, packets, frames, etc.), file system data (e.g., files), runtime data (e.g., data generated during runtime of an application, which may be stored in volatile memory), data stored in volatile memory, data stored in non-volatile memory, application data (e.g., executable data for one or more applications), data associated with an isolated environment (e.g., data generated or otherwise associated with a virtual machine, data generated or otherwise associated with a trusted execution environment, data generated or otherwise associated with an isolated cloud service, etc.), metadata, behavioral data (e.g., data describing behaviors taken by a program during runtime), location data (e.g., geographical/physical location data of a device, user, etc.), quality assurance data, financial data, financial analytics data, healthcare analytics data, and so on. The data 110 may be formatted in a variety of manners and/or according to a variety of standards. In some examples, data includes a header, payload, and/or footer section. The data 110 may include multiple pieces of data (e.g., multiple files or other units of data) or a single piece of data (e.g., a single file or another unit of data). In some embodiments, the data 110 includes non-image-based data, such as data that is not intended to be represented within a coordinate system (e.g., not stored in a format that is intended for display). In contrast, image-based data may generally be formatted for display, such as images, 2D models, 3D models, point cloud data, and so on. In some embodiments, a type of data may be defined by or based on a format of the data, a use of the data, an environment in which the data is stored or used (e.g., an operating system, device platform, etc.), a device that generated the data, a size of the data, an age of the data (e.g., when the data was created), and so on.

The AI component 124 may be configured to train a model to create a machine-trained model that is configured to analyze an n-dimensional representation and/or detect any threats associated with the n-dimensional representation. For example, the AI component 124 may analyze the training data from the data store 126 that includes one or more n-dimensional representations that are tagged as being associated with a threat and/or one or more n-dimensional representations that are tagged as being threat free (e.g., not associated with a threat). An n-dimensional representation may be tagged (e.g., categorized) by a user and/or a system. The AI component 124 may analyze the training data to generate one or more machine-trained models, such as one or more artificial neural networks or another Artificial Intelligence model. The AI component 124 may store the one or more machine-trained models within the data store 125. The one or more machine-trained models may include models configured for different types of data, different coordinate systems, and so on. In some embodiments, the AI component 124 may learn one or more characteristics (e.g., features, markers, etc.) that are located in n-dimensional representations that are associated with threats and train a machine-trained model to detect such one or more characteristics. For example, the AI component 124 may use pattern recognition, feature detection, and/or a spatial analysis to identify one or more characteristics and/or patterns of one or more characteristics. In some embodiments, a characteristic may include a spatial feature, such as a computer vision/image processing feature (e.g., edges, corners (interest points), blobs (regions of interest points), ridges, etc.). However, a characteristic may include any characteristic within an n-dimensional representation, whether visualizable/spatial or non-visualizable/non-spatial. In some embodiments, training a model includes machine learning or other AI techniques.

In some embodiments, the AI component 124 may train one or more models for different types of threats. For example, a model may be trained to detect/identify malware, a particular type of malware (e.g., a virus, spyware, ransomware, a particular type of virus, a particular type of spyware, a particular type of ransomware, etc.), and so on. To illustrate, the AI component 124 may learn that a particular characteristic (e.g., feature) in an n-dimensional representation is associated with a virus or a particular type of virus and train a model to detect the particular characteristic and/or to identify the particular characteristic as being associated with the virus or the particular type of virus. In some embodiments, the AI component 124 may train a first model to detect/identify a first type of threat and train a second model to detect/identify a second type of threat.

The AI component 124 may be configured to process an n-dimensional representation with a model, such as one or more of the machine-trained models stored in the data store 125, a human-trained model, or any other model. For example, the AI component 124 may receive the n-dimensional representation 112 from the representation generation component 123 and process the n-dimensional representation 112 with a machine-trained model stored in the data store 125 to identify any threats associated with the n-dimensional representation 112. In some embodiments, the AI component 124 may identify a type of threat associated with the n-dimensional representation 112, such as malware, a particular type of malware (e.g., a virus, spyware, ransomware, a particular type of virus, a particular type of spyware, a particular type of ransomware, etc.), and so on. In some embodiments, the processing includes pattern recognition, feature detection, and/or a spatial analysis, which may include identifying one or more characteristics (e.g., features) within the n-dimensional representation 112.

In some embodiments, the AI component 124 may be configured to use different models to analyze one or more n-dimensional representations. In some examples, the AI component 124 may determine a type of data under analysis and use a model that is designated for the type of data. Further, in some examples, the AI component 124 may process an n-dimensional representation multiple times with different models, such as processing the n-dimensional representation 112 with a first model and processing the n-dimensional representation 112 with a second model. Here, the AI component 124 may detect any threats if either analysis detects a threat. In some instances of processing a same n-dimensional representation multiple times, the AI component 124 may provide more accurate results regarding any potential threats. However, processing an n-dimensional representation once may be sufficient or just as accurate in many instances. The AI component 124 may process multiple n-dimensional representations corresponding to multiple pieces of data (e.g., multiple files) with the same or different models.

In some embodiments, the AI component 124 may detect a physical threat associated with data. For example, the representation generation component 123 may process data representing a physical environment, such as images of the interior or exterior of a building, and generate an n-dimensional representation for the data. The AI component 124 may process the n-dimensional representation to identify a potential threat, such as an access point that may potentially be at risk of a break-in due to reduced security features at the access point. Furthermore, the AI component 124 may be configured to detect a variety of other types of threats.

The AI component 124 may be configured to provide a variety of types of output regarding processing of an n-dimensional representation. For example, based on processing the n-dimensional representation 112 with a machine-trained model from the data store 125, the AI component 124 may determine if the n-dimensional representation 112 is associated with any threats and/or determine the types of threats, if any. In some embodiments, the AI component 124 may generate information (e.g., a report, notification, a threat rating, etc.) indicating if a threat was detected, a type of threat that was detected, a confidence value of a detected threat (e.g., a rating on a scale of 1 to 10 of a confidence that data includes a threat, with 10 (or 1) being the highest confidence that the data includes a threat), and so on. In some examples, the AI component 124 may provide the information to the user interface device 160 (e.g., in the message 162), which may display the information via the user interface 164 and/or another manner. In the example of FIG. 1, the user interface 164 provides information indicating that 21 threats were detected and a control to select to see more information regarding the threats, such as the type of threats, means for addressing the threats, etc. A user may view information provided via the user interface 164 and/or cause an operation to be formed, such as having a threat removed from the data 110, preventing a threat from further corrupting the data 110, preventing a threat from being stored with the data 110, and so on. Further, in some examples, the AI component 124 may provide the information (e.g., the message 162) to another device and/or cause an operation to be performed automatically to address any threats.

Although the representation generation component 123 and the AI component 124 are illustrated as being implemented as part of the service provider 120, in some embodiments the representation generation component 123 and/or the AI component 124 may be implemented at least in part by the user interface device 160. For example, the representation generation component 123 may be implemented at the user interface device 160 to generate an n-dimensional representation of data stored on the user interface device 160 or in a facility associated with the user interface device 160, and the AI component 124 may be implemented at the service provider 122 to process the n-dimensional representation. Here, the user interface device 160 may provide the n-dimensional representation to the service provider 120 for processing and/or the user interface device 160 may receive a message from the service provider 120 regarding the processing. Further, in some examples, the representation generation component 123 may be implemented at the service provider 120 to generate an n-dimensional representation and the AI component 124 may be implemented at the user interface device 160 to process the n-dimensional representation. Moreover, in some examples, the user interface device 160 may implement a local instance of the representation generation component 123 and/or the AI component 124 and the service provider 120 may implement a remote instance of the representation generation component 123 and/or the AI component 124. Here, the components 123 and/or 124 on the user interface device 160 and the components 123 and/or 124 on the service provider 120 may divide the functionality in a variety of manners and operate in cooperation to evaluate data.

The representation generation component 123 and/or the AI component 124 may be configured to evaluate data at any time. In some embodiments, an evaluation of data is performed in response to a request by the user interface device 160, such as a user providing input through the user interface device 160 to analyze data. Further in some embodiments, an evaluation of data is performed periodically and/or in response to a non-user-based request received by the user interface device 160 and/or another device.

The one or more network interfaces 127 may be configured to communicate with one or more devices over a communication network. For example, the one or more network interfaces 127 may send/receive data in a wireless or wired manner over one or more networks 180 to/from the user interface device 160 and/or the data store 140. In some embodiments, the one or more network interfaces 127 may implement a wireless technology such as Bluetooth, Wi-Fi, near field communication (NFC), or the like.

The data store 140 may be associated with any entity and/or located at any location. In some examples, the data store 140 is associated with a first entity (e.g., company, environment, etc.) and the service provider 120 is associated with a second entity that provides a service to evaluate data. For instance, the data store 140 may be implemented in a cloud environment or locally at a facility to store a variety of forms of data and the service provider 120 may evaluate the data to provide information regarding security of the data, such as whether or not the data includes malicious data. In some examples, the data store 140 and the service 120 are associated with a same entity and/or located at a same location. As such, although the data store 140 is illustrated in the example of FIG. 1 as being located separate from the service provider 120, in some examples the data store 140 may be included within the service provider 120, such as within the memory 122.

The user interface device 160 may be implemented as one or more computing devices, such as one or more desktop computers, one or more laptops computers, one or more servers, one or more smartphones, one or more electronic reader devices, one or more mobile handsets, one or more personal digital assistants, one or more portable navigation devices, one or more portable gaming devices, one or more tablet computers, one or more wearable devices (e.g., a watch), one or more portable media players, one or more televisions, one or more set-top boxes, one or more computer systems in a vehicle, one or more appliances, one or more cameras, one or more security systems, one or more home-based computer systems, one or more projectors, and so on. The user interface device 160 may include control circuitry, memory, one or more network interfaces, and/or one or more input/output (I/O) components communicatively coupled to each other. In some embodiments, the memory stores executable instructions that, when executed by the control circuitry, cause the control circuitry to perform various operations discussed herein. The one or more network interfaces may be configured to communicate over the one or more networks 180 or any other network. In some embodiments, the user interface device 160 is employed with an administrator (e.g., an Information Technology (IT) individual) to perform an evaluation of data associated with an entity (e.g., a company, environment, etc.).

The one or more I/O components of the user interface device 160 may include one or more displays, one or more microphones, one or more speakers, one or more keyboards, one or more mice, one or more cameras, and so on. The one or more displays may be configured to display data associated with certain aspects of the present disclosure. For example, the one or more displays may be configured to present a graphical user interface (GUI) to facilitate operation of the user interface device 160, present information associated with an evaluation of data (e.g., information indicating if a threat is detected, a type of threat detected, etc.), provide input to cause an operation to be performed to address a threat (e.g., an operation to have a threat removed, prevent a threat from associated with and/or further corrupting data, prevent a threat from being stored with data, etc.), and so on. The one or more displays may include a liquid-crystal display (LCD), a light-emitting diode (LED) display, an organic LED display, a plasma display, an electronic paper display, or any other type of technology. In some embodiments, the one or more displays include one or more touchscreens and/or other user input/output (I/O) devices.

The service provider 120, the data store 140, and/or the user interface device 160 may be configured to communicate over the one or more networks 180. The one or more networks 180 may comprise one or more personal area networks (PAN), one or more local area networks (LANs), one or more wide area networks (WANs), one or more Internet area networks (IANs), one or more cellular networks, the Internet, etc. The one or more networks 180 may include one or more wireless and or one or more wired networks.

Figure 2:
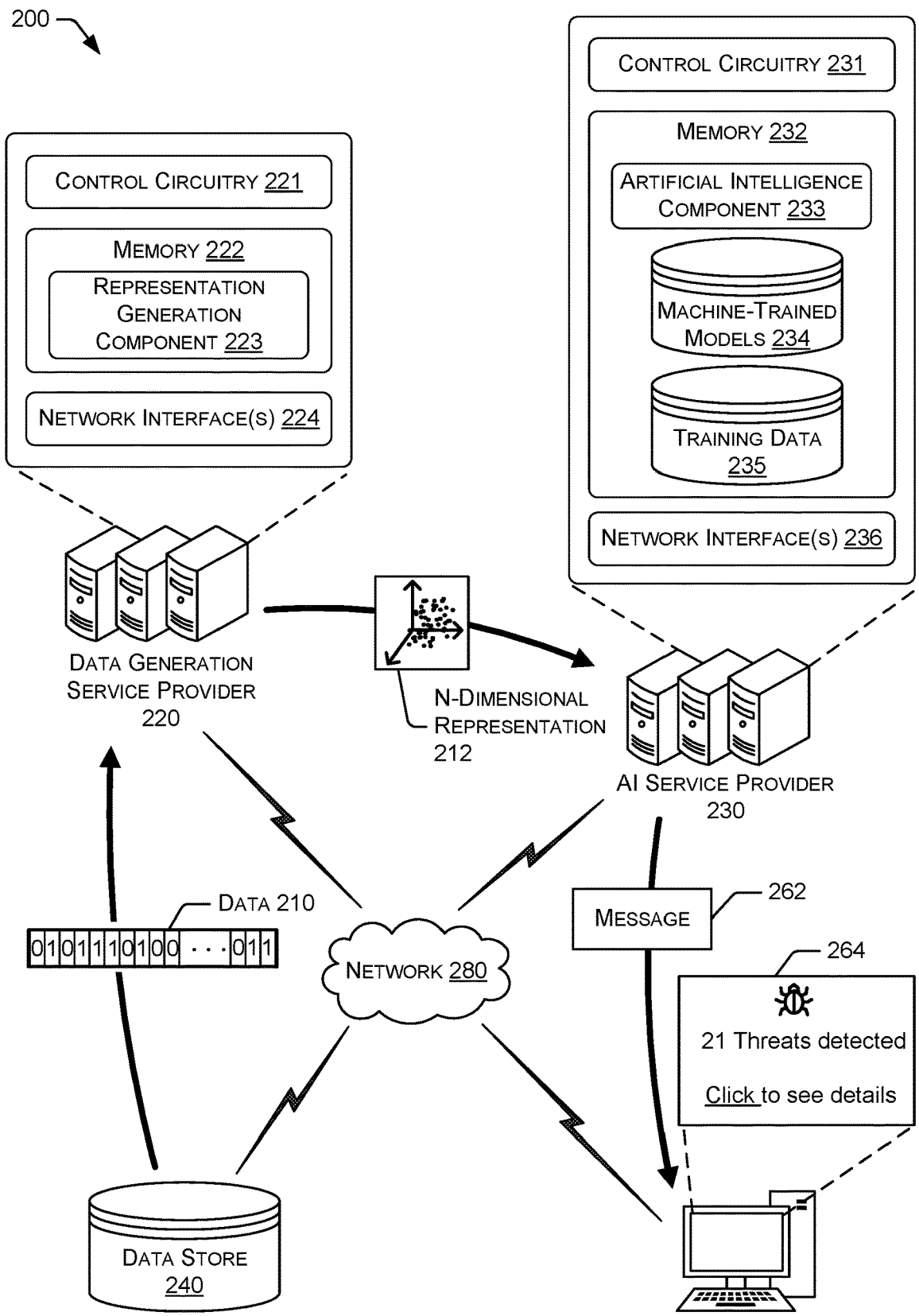
FIG. 2 illustrates another example architecture in which the techniques described herein may be implemented.

FIG. 2 illustrates another example architecture 200 in which the techniques described herein may be implemented. The architecture 200 includes a data generation service provider 220 that generally facilitates generation of one or more n-dimensional representations and an Artificial Intelligence (AI) service provider 230 that generally facilitates evaluation of one or more n-dimensional representations to detect any threats. In some embodiments, the data generation service provider 220 and the AI service provider 230 are associated with different entities and/or located at different locations. In other embodiments, the data generation service provider 220 and the AI service provider 230 are associated with the same entity and/or located at the same location. The architecture 200 also includes a data store 240 to store data and a user interface device 260 configured to provide various output and/or receive input regarding on evaluation of data. For example, the user interface device 260 may be configured to communicate with the data generation service provider 220 (e.g., to initiate an evaluation) and/or the AI service provider 230 (e.g., to receive information regarding an evaluation). In some embodiments, the user interface device 260 is configured to provide a user interface 264 to receive input and/or provide output.

The data generation service provider 220 may be implemented as one or more computing devices, such as one or more servers, one or more desktop computers, one or more laptops computers, or any other type of device configured to process data. In some embodiments, the one or more computing devices are configured in a cluster, data center, cloud computing environment, or a combination thereof. In some embodiments, the one or more computing devices of the data generation service provider 220 are implemented as a remote computing resource that is located remotely to the user interface device 260, the data store 240, and/or the AI service provider 230. In other embodiments, the one or more computing devices of the data generation service provider 220 are implemented as local resources that are located locally at the user interface device 260, the data store 240, and/or the AI service provider 230. As illustrated, the data generation service provider 220 may include control circuitry 221 (similar to or the same as the control circuitry 121 of FIG. 1), memory 222 (similar to or the same as the memory 122 of FIG. 1), and one or more network interfaces 224 (similar to or the same as the one or more network interfaces 127 of FIG. 1).

The memory 222 of the data generation service provider 220 may be configured to store a representation generation component 223, which may perform functionality similar to or the same as the representation generation component 123 of FIG. 1. For example, the representation generation component 223 may be configured to receive data 210 from the data store 240, process the data 210 to generate an n-dimensional representation 212, and/or perform a variety of other operations. In the example of FIG. 2, the representation generation component 223 is further configured to provide the n-dimensional representation 212 to the AI service provider 230.

The AI service provider 230 may be implemented as one or more computing devices, such as one or more servers, one or more desktop computers, one or more laptops computers, or any other type of device configured to process data. In some embodiments, the one or more computing devices are configured in a cluster, data center, cloud computing environment, or a combination thereof. In some embodiments, the one or more computing devices of the AI service provider 230 are implemented as a remote computing resource that is located remotely to the user interface device 260, the data store 240, and/or the data generation service provider 220. In other embodiments, the one or more computing devices of the AI service provider 230 are implemented as local resources that are located locally at the user interface device 260, the data store 240, and/or the data generation service provider 220. As illustrated, the AI service provider 230 can include control circuitry 231 (similar to or the same as the control circuitry 121 of FIG. 1), memory 232 (similar to or the same as the memory 122 of FIG. 1), and one or more network interfaces 236 (similar to or the same as the one or more network interfaces 127 of FIG. 1).

The memory 232 of the AI service provider 230 may be configured to store an AI component 233, which may perform functionality similar to or the same as the AI component 124 of FIG. 1. For example, the AI component 233 may be configured to use training data stored in a data store 235 to train one or more models and create one or more machine-trained models, store one or more machine-trained models in a data store 234, receive the n-dimensional representation 212 from the data generation service provider 220, process the n-dimensional representation 212 using a machine trained model or another model, detect any threats associated with the n-dimensional representation 212, and/or perform a variety of other operations. In some embodiments, the AI service provider 230 is configured to provide information regarding an evaluation of data (e.g., information indicating any threats associated with the data, types of threats associated with the data, etc.) to the user interface device 260, such as in a message 262.

The one or more network interfaces 224 of the data generation service provider 220 and/or the one or more network interfaces 236 of the AI service provider 230 may be configured to communicate with one or more devices over a communication network. For example, the one or more network interfaces 224 and/or the one or more network interfaces 236 may send/receive data in a wireless or wired manner over one or more networks 280. In some embodiments, the one or more network interfaces 224 and/or the one or more network interfaces 236 may implement a wireless technology such as Bluetooth, Wi-Fi, near field communication (NFC), or the like. The one or more networks 280 may comprise one or more personal area networks (PAN), one or more local area networks (LANs), one or more wide area networks (WANs), one or more Internet area networks (IANs), one or more cellular networks, the Internet, etc. The one or more networks 280 may include one or more wireless and or one or more wired networks.

The data store 240 may be associated with any entity and/or located at any location. In some examples, the data store 240 is associated with a first entity (e.g., company, environment, etc.) and the data generation service provider 220 and/or the AI service provider 230 are associated with a second entity that provides a service to evaluate data. Further, in some examples, the data store 240, the data generation service provider 220, and/or the AI service provider 230 are associated with a same entity and/or located at a same location. As such, although the data store 240 is illustrated in the example of FIG. 2 as being located separate from the data generation service provider 220 and the AI service provider 230, in some examples the data store 240 may be included within the data generation service provider 220 and/or the AI service provider 230.

Figure 3:
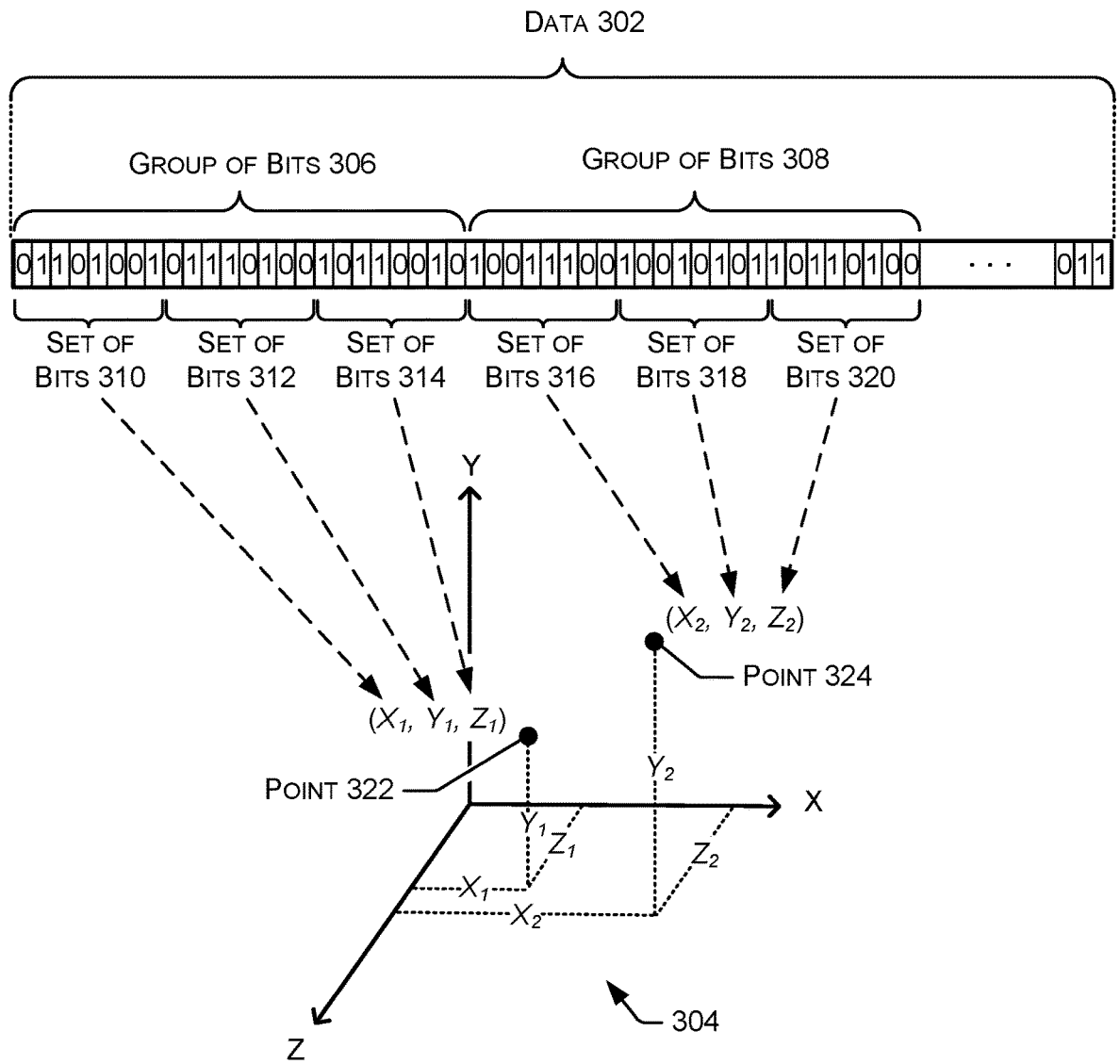
FIG. 3 illustrates an example process of converting data to an n-dimensional representation in accordance with one or more embodiments.

FIG. 3 illustrates an example process of converting data to an n-dimensional representation in accordance with one or more embodiments. In this example, a service provider, such as the service provider 120 of FIG. 1 and/or the data generation service provider 220 of FIG. 2, processes data 302 at a bit/byte level to generate an n-dimensional representation for the data 302. In particular, the service provider processes the data 302 in groups of bits, with each group of bits being converted to coordinates for a point. For example, the service provider may identify a first group of bits 306 that includes three bytes of data, with each byte of data corresponding to a set of bits. As shown, the group of bits 306 includes a set of bits 310 (i.e., a first byte), a set of bits 312 (i.e. a second byte), and a set of bits 314 (i.e., a third byte). The set of bits 310 are directly adjacent to the set of bits 312 and the set of bits 312 are directly adjacent to the set of bits 314. In this example, the service provider converts the set of bits 310 to an x-coordinate value (illustrated as "$X_1$"), the set of bits 312 to a y-coordinate value (illustrated as "$Y_1$"), and the set of bits 314 to a z-coordinate value (illustrated as "$Z_1$"). The service provider may use the coordinate values to produce a point 322 within a coordinate system 304 (e.g., position the point 322), as shown.

Similarly, the service provider may identify a second group of bits 308 that includes three bytes of data, with each byte of data corresponding to a set of bits. As shown, the group of bits 308 includes a set of bits 316 (i.e., a first byte), a set of bits 318 (i.e. a second byte), and a set of bits 320 (i.e., a third byte). The set of bits 316 are directly adjacent to the set of bits 318 and the set of bits 318 are directly adjacent to the set of bits 320. In this example, the service provider may convert the set of bits 316 to an x-coordinate value (illustrated as "$X_2$"), the set of bits 318 to a y-coordinate value (illustrated as "$Y_2$"), and the set of bits 320 to a z-coordinate value (illustrated as "$Z_2$"). The service provider may use the coordinate values to create a point 324 within the coordinate system 304, as shown. The service provider can proceed to process any number of bits (e.g., groups of bits) in the data 302 in a similar fashion to produce any number of points within the coordinate system 304.

For ease of illustration, the n-dimensional representation of FIG. 3 is illustrated with two points; however, the n-dimensional representation may include any number of points, such as hundreds or thousands of points. Further, although the n-dimensional representation of FIG. 3 is illustrated with points, as noted above an n-dimensional representation may include other representations, such as an n-dimensional map, n-dimensional model, and so on, that is generated based on points.

In the example of FIG. 3, the data 302 represents a unit of data, such as a file. In many examples, the service provider may perform a similar process for any number of units of data (e.g., any number of files) to generate any number of n-dimensional representations. Although the example of FIG. 3 is illustrated in the context of three bytes representing a group of bits and one byte representing a set of bits, a group of bits and/or a set of bits may include any number of bits or bytes. To illustrate, a group of bits may include two bytes of data (or an arbitrary number of bits, such as ten bits), with each byte (or set of five bits) being converted to a coordinate for a two-dimensional coordinate system. Moreover, in some examples the service provider may process data in other manners, such as by converting the first 300 bytes of data to x-coordinates, the second 300 bytes of data to y-coordinates, and the third 300 bytes of data to z-coordinates. Furthermore, the service provider may process data in a variety of other manners.

Figure 4:
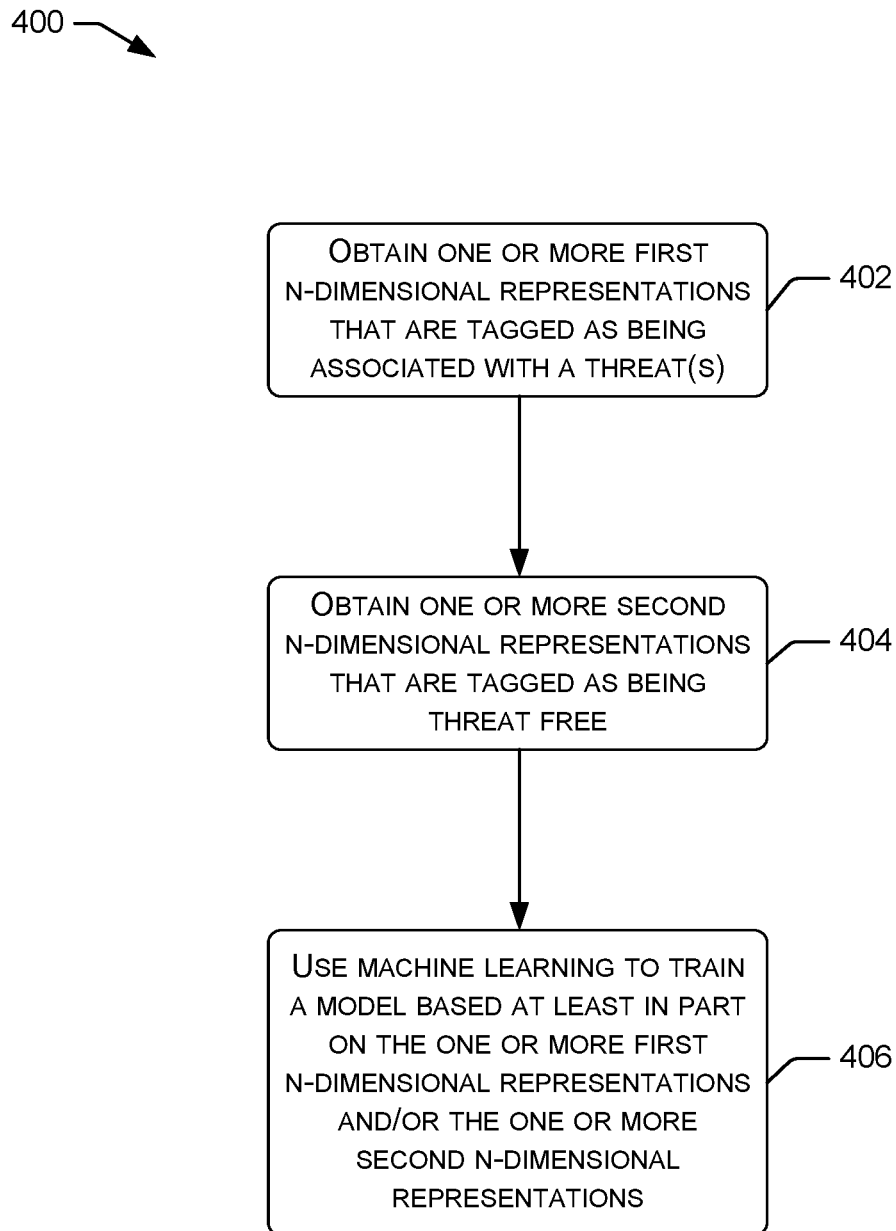
FIG. 4 illustrates an example process to train a model in accordance with one or more embodiments.
Figure 5:
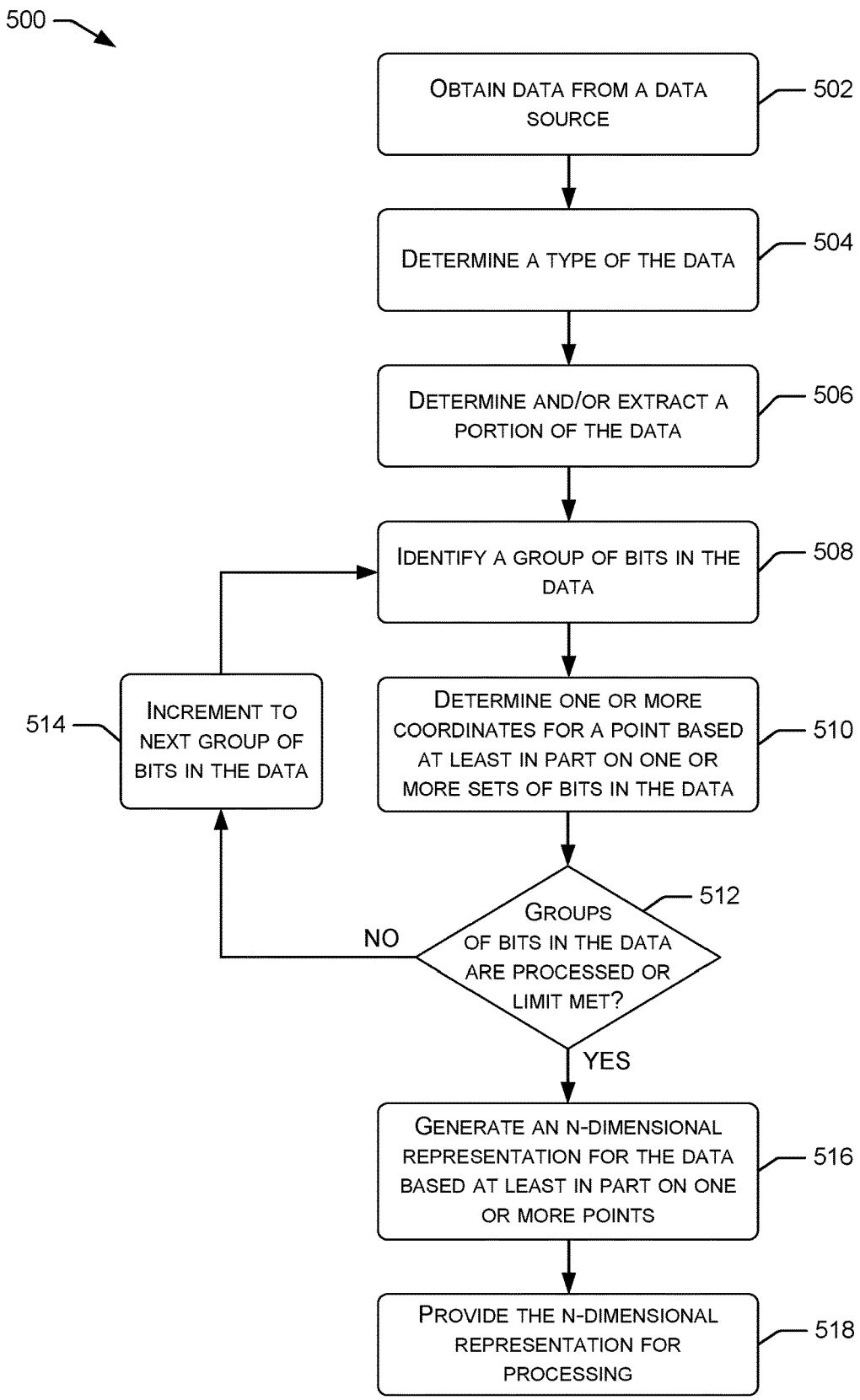
FIG. 5 illustrates an example process to produce one or more n-dimensional representations in accordance with one or more embodiments.
Figure 6:
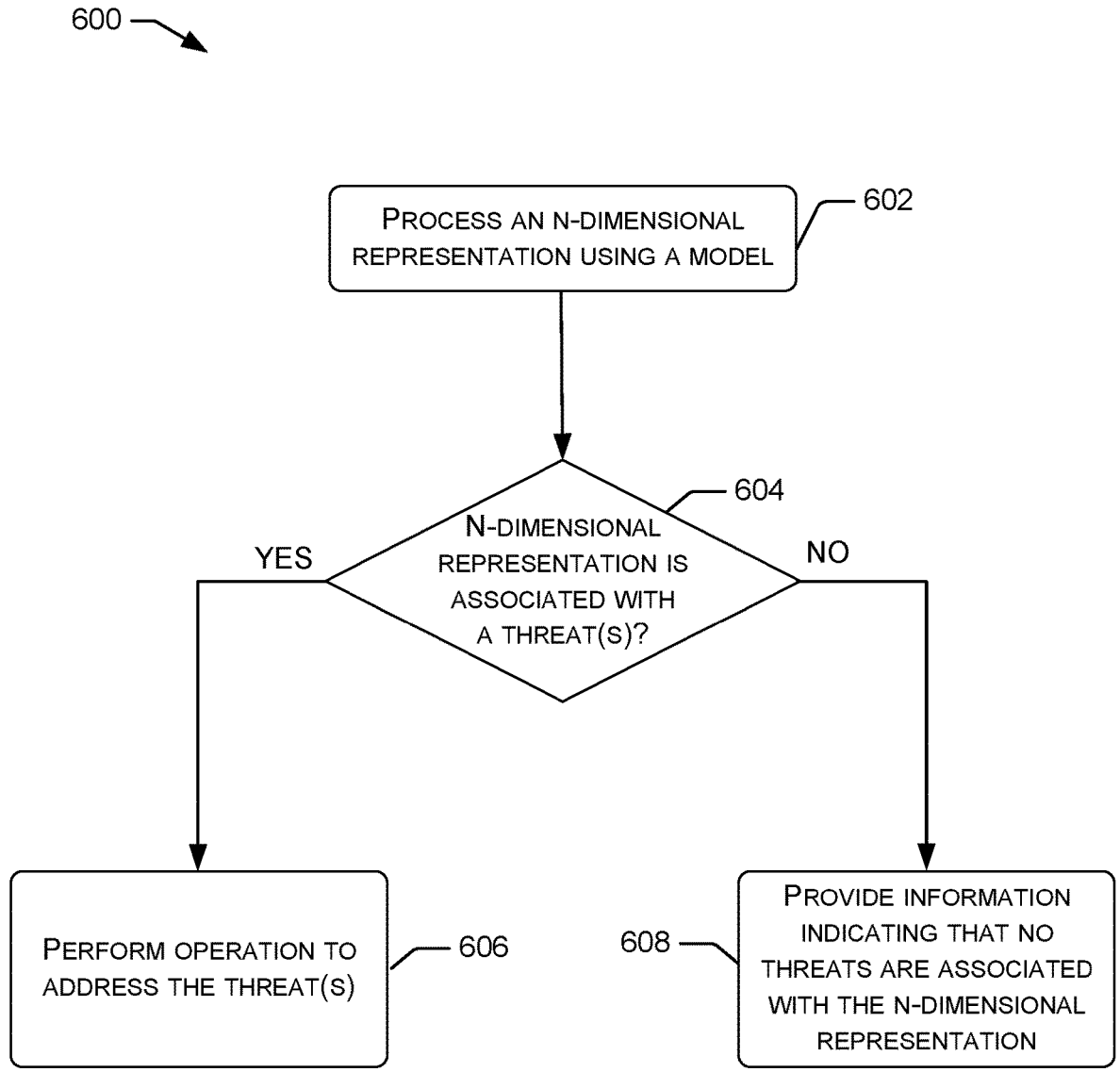
FIG. 6 illustrates an example process to process an n-dimensional representation using a model in accordance with one or more embodiments.

FIGS. 4, 5, and 6 illustrate example processes 400, 500, and 600, respectively, in accordance with one or more embodiments. For ease of illustration, processes 400, 500, and 600 may be described as being performed in the example architecture 100 of FIG. 1. For example, one or more of the individual operations of the processes 400, 500, and/or 600 may be performed by the service provider 120 (and/or the user interface device 160, in some instances). However, the processes 400, 500, and/or 600 may be performed in other architectures. Moreover, the architecture 100 may be used to perform other processes.

The processes 400, 500, and 600 (as well as each process described herein) are each illustrated as a logical flow graph, each graph of which represents a sequence of operations that can be implemented in hardware, software, or a combination thereof. In the context of software, the operations represent computer-executable instructions stored on one or more computer-readable media that, when executed by control circuitry (e.g., one or more processors), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement a process. Further, any number of the described operations may be omitted.

FIG. 4 illustrates the example process 400 to train a model in accordance with one or more embodiments.

At 402, one or more first n-dimensional representations that are tagged as being associated with one or more threats may be obtained. For example, the service provider 120 can receive training data (e.g., one or more n-dimensional representations) that has been tagged as being associated with malware. The training data may have been tagged by a user, a system, or another entity. In some embodiments where the training data includes one or more n-dimensional representations, the one or more n-dimensional representations may have been generated by the service provider 120 by processing data at a bit or byte level, similar to various processes described herein.

At 404, one or more second n-dimensional representations that are tagged as being threat free may be obtained. For example, the service provider 120 may retrieve training data (e.g., one or more n-dimensional representations) that has been tagged as being malware free (e.g., not associated with malware). The training data may have been tagged by a user, a system, or another entity. In some embodiments where the training data includes one or more n-dimensional representations, the one or more n-dimensional representations may have been generated by the service provider 120 by processing data at a bit or byte level, similar to various processes described herein.

At 406, machine learning can be used to train a model based at least in part on the one or more first n-dimensional representations and/or the one or more second n-dimensional representations. For example, the service provider 120 may analyze training data that is tagged as being associated with malware and/or the training data that is tagged as being malware free and learn what information (e.g., features) are associate with malware. By performing the training, the service provider 120 may create a machine-trained model that is configured to detect malware or other threats and/or identify types of malware or other threats.

FIG. 5 illustrates the example process 500 to produce one or more n-dimensional representations in accordance with one or more embodiments.

At 502, data can be obtained from a data source. For example, the service provider 120 can receive or retrieve the data 110 from the data store 140. The data 110 can comprise a variety of types of data, such as file system data, non-image-based data, network traffic data, runtime data, data associated with an isolated environment, or any other data.

At 504, a type of the data can be determined. For example, the service provider 120 can determine a type of the data 110, such as a format of the data 110, a use of the data 110, an environment in which the data 110 is stored or used, a device that generated the data 110, a size of the data, an age of the data, and so on.

At 506, a portion of the data may be determined and/or extracted. For example, the service provider 120 may extract a first portion of the data 110, such as a first predetermined number of bytes of the data 110, and/or refrain from extracting a second portion of the data 110. In some embodiments, the service provider 120 may determine and/or extract a portion of the data 110 based at least in part on a type of the data 110. As such, the service provider 120 may determine to represent the data 110 with a particular portion of the data 110.

Although the operations 504 and 506 are illustrated as part of the example process 500, in some embodiments the operations 504 and/or 506 (as well as any other operation) may not be performed.

At 508, a group of bits in the data may be identified. For example, the service provider 120 may identify three bytes in the data 110 as representing a group of bits. In some embodiments when a portion of the data 110 has been extracted at the operation 506, the service provider 120 may initially identify a group of bits at a start of the portion of the data 110.

At 510, one or more coordinates for a point may be determined based at least in part on one or more sets of bits in the data. For example, the service provider 120 may determine a first coordinate for a point based at least in part on a first set of bits in a group of bits, a second coordinate for the point based at least in part on a second set of bits in the group of bits, a third coordinate for the point based at least in part on third set of bits in the group of bits, and so on. In some embodiments, the first set of bits comprises a first byte, the second set of bits comprises a second byte that is directly adjacent to the first byte, and/or the third set of bits comprises a third byte that is directly adjacent to the second byte. As such, the service provider 120 may represent a set of bits as a coordinate for a point.

At 512, it may be determined if groups of bits in the data (e.g., all groups) are processed or a limit is met. For example, if the service provider 120 has extracted a portion of the data 110 for processing, such as a header of a file, the service provider 120 may determine if another group of bits exists in the portion of the data 110 (e.g., if there exists another group of bits that has not yet been converted to a point). That is, the service provider 120 may determine if it has reached an end of the data 110 (or portion of the data 110). Additionally, or alternatively, if a limit is set so that the service provider 120 is configured to process a particular number of bits or bytes (e.g., the first 1500 bytes of data), the service provider 120 may determine if the limit is reached (e.g., the service provider 120 has processed the first 1500 bytes of data).

If the groups of bits in the data that are designated to be processed are processed and/or the limit is reached, the process 500 may proceed to operation 516 (i.e., the "YES" branch). Alternatively, if the groups of bits in the data that are designated to be processed are not processed yet and/or the limit is not reached, the process 500 may proceed to operation 514 (i.e., the "NO" branch).

At 514, a next group of bits in the data may be designated for processing. For example, the service provider 120 may increment to a next group of bits in the data, and then proceed to the operation 508 to identify the next group of bits in the data and to the operation 510 to determine one or more coordinates for the next group of bits. The process 500 may loop through operations 514, 508, and 510 any number of times, if needed, to process the data.

At 516, an n-dimensional representation for the data may be generated based at least in part on one or more points. For example, the service provider 120 may use one or more coordinates for each point to generate the n-dimensional representation 112 for the data 110. The n-dimensional representation 112 may include an n-dimensional point cloud, an n-dimensional map, an n-dimensional model, and so on.

At 518, the n-dimensional representation may be provided for processing. For example, a component of the service provider 120 may provide the n-dimensional representation 112 to another component of the service provider 120 and/or another service provider for processing with a machine-trained model. That is, the service provider 120 may cause the n-dimensional representation 112 to be processed with a machine-trained model that is configured to detect a threat.

In some embodiments, data includes multiple pieces of data (e.g., multiple files) and the process 500 is performed for each piece of data. Further, in some embodiments, the process 500 is performed multiple times for the same data to generate different types of n-dimensional representations for the data.

FIG. 6 illustrates the example process 600 to process an n-dimensional representation using a model in accordance with one or more embodiments.

At 602, an n-dimensional representation may be processed using a model. For example, the service provider 120 may process the n-dimensional representation 112 using a machine-trained model from the data store 125 and/or another model (e.g., a human-trained model). The service provider 120 may seek to identify information or features within the n-dimensional representation 112 that are associated with one or more threats. In some embodiments, a machine-trained model includes an artificial neural network.

At 604, it may be determined if the n-dimensional representation is associated with one or more threats. For example, the service provider 120 may determine if the n-dimensional representation 112 is associated with one or more threats, such as malware, based at least in part on the processing at the operation 602.

If the n-dimensional representation is associated with one or more threats, the process 600 may proceed to operation 606 (i.e., the "YES" branch). Alternatively, if the n-dimensional representation is not associated with any threats, the process 600 may proceed to operation 608 (i.e., the "NO" branch).

At 606, an operation may be performed to address the one or more threats. For example, the service provider 120 may perform or cause to be performed a threat operation that includes removing a threat, preventing a threat from associating with the data 112, providing information (e.g., a notification, a report, a malware rating indicating a likelihood that the data is associated with malware, etc.) to the user interface device 160 regarding the threat, and so on.

At 608, information may be provided indicating that no threats are associated with the n-dimensional representation. For example, the service provider 120 may provide information (e.g., a notification, a report, etc.) to the user interface device 160 indicating that no threats have been detected for the data 110.

The above description of embodiments of the disclosure is not intended to be exhaustive or to limit the disclosure to the precise form disclosed above. While specific embodiments, and examples, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, articles ("a" and "an") may indicate "one or more" rather than "one." Further, an operation performed "based on" a condition or event may also be performed based on one or more other conditions or events not explicitly recited. In some contexts, description of an operation or event as occurring or being performed "based on," or "based at least in part on," a stated event or condition can be interpreted as being triggered by or performed in response to the stated event or condition.

With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

It should be appreciated that in the above description of embodiments, various features are sometimes grouped together in a single embodiment, figure, or description thereof for the purpose of streamlining the disclosure and aiding in the understanding of one or more of the various aspects of the disclosure. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the disclosure should not be limited by the particular embodiments described above.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same, related, or unrelated reference numbers. The relevant features, elements, functions, operations, modules, etc. may be the same or similar functions or may be unrelated.

The term "module" is used in the description of one or more of the embodiments. A module implements one or more functions via a device, such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

Example Clauses

Example A, a method of detecting malware, the method comprising: receiving, by a computing device, data from a data store; identifying, by the computing device, at least a first group of bits in the data and a second group of bits in the data; representing, by the computing device, a first set of bits in the first group of bits as a first coordinate for a first point and a second set of bits in the first group of bits as a second coordinate for the first point; representing, by the computing device, a first set of bits in the second group of bits as a first coordinate for a second point and a second set of bits in the second group of bits as a second coordinate for the second point; generating, by the computing device, an n-dimensional representation for the data based at least in part on the first point and the second point; processing the n-dimensional representation using a model that has been trained using machine learning; and determining a malware rating for the data based at least in part on the processing, the malware rating indicating a likelihood that the data is associated with malware.

Example B, the method of Example A, further comprising: representing, by the computing device, a third set of bits in the first group of bits as a third coordinate for the first point, wherein the n-dimensional representation comprises a three-dimensional representation.

Example C, the method of Example A or B, wherein the first set of bits in the first group of bits comprises a first byte, the second set of bits in the first group of bits comprises a second byte that is directly adjacent to the first byte, and the third set of bits in the first group of bits comprises a third byte that is directly adjacent to the second byte.

Example D, the method of any of Examples A-C, wherein the data comprises file system data.

Example E, the method of any of Examples A-D, wherein the data comprises non-image-based data.

Example F, a system comprising: control circuitry; and memory communicatively coupled to the control circuitry and storing executable instructions that, when executed by the control circuitry, cause the control circuitry to perform operations comprising: obtaining data; determining a first coordinate for a first point based at least in part on a first set of bits in the data and determining a second coordinate for the first point based at least in part on a second set of bits in the data that is adjacent to the first set of bits; determining a first coordinate for a second point based at least in part on a third set of bits in the data and determining a second coordinate for the second point based at least in part on a fourth set of bits in the data that is adjacent to the third set of bits; generating an n-dimensional representation for the data based at least in part on the first point and the second point; and causing the n-dimensional representation to be processed with a machine-trained model that is configured to detect malware.

Example G, the system of Example F, wherein the first set of bits comprises a first byte and the second set of bits comprises a second byte that is directly adjacent to the first byte.

Example H, the system of Example F or G, wherein obtaining the data comprises retrieving data from a data store, the data comprising file system data.

Example I, the system of any of Examples F-H, wherein the operations further comprise: extracting a first portion of the data and refraining from extracting a second portion of the data, the first portion of the data including the first set of bits and the second set of bits.

Example J, the system of any of Examples F-I, wherein the operations further comprise: determining a type of the data; and determining to represent the data with a first portion of the data based at least in part on the type of the data, the first portion of the data including the first set of bits and the second set of bits.

Example K, the system of any of Examples F-J, wherein the first portion of the data includes at least one of a header, a body, or a footer.

Example L, the system of any of Examples F-K, wherein the operations further comprise: determining a type of the data; and determining to represent the data with a first portion of the data and a second portion of the data based at least in part on the type of the data, the first portion of the data including the first set of bits and the second set of bits.

Example M, the system of any of Examples F-L, wherein the operations further comprise: training a model to create the machine-trained model, the training being based at least in part on one or more n-dimensional representations that are tagged as being associated with malware and one or more n-dimensional representations that are tagged as being malware free.

Example N, one or more non-transitory computer-readable media storing computer-executable instructions that, when executed, instruct one or more processors to perform operations comprising: obtaining data; determining a first coordinate for a first point based at least in part on a first set of bits in the data and determining a second coordinate for the first point based at least in part on a second set of bits in the data that is adjacent to the first set of bits; determining a first coordinate for a second point based at least in part on a third set of bits in the data and determining a second coordinate for the second point based at least in part on a fourth set of bits in the data that is adjacent to the third set of bits; generating an n-dimensional representation for the data based at least in part on the first and second coordinates for the first point and the first and second coordinates for the second point; and causing the n-dimensional representation to be processed with a machine-trained model that is configured to detect a threat.

Example O, the one or more non-transitory computer-readable media of Example N, wherein the data comprises at least one of file system data, network traffic data, runtime data, or data associated with an isolated environment.

Example P, the one or more non-transitory computer-readable media of Example N or O, wherein the operations further comprise: processing the n-dimensional representation with the machine-trained model; detecting the threat based at least in part on the processing; and performing a threat operation to address the threat, the threat operation comprising at least one of removing the threat, preventing the threat from associating with the data, or providing a notification to a computing device regarding the threat.

Example Q, the one or more non-transitory computer-readable media of any of Examples N-P, wherein the first set of bits is directly adjacent to the second set of bits.

Example R, the one or more non-transitory computer-readable media of any of Examples N-Q, wherein the operations further comprise: determining a type of the data; and determining to represent the data with a first portion of the data based at least in part on the type of the data, the first portion of the data including the first set of bits, the second set of bits, the third set of bits, and the fourth set of bits.

Example S, the one or more non-transitory computer-readable media of any of Examples N-R, wherein the operations further comprise: training a model to create the machine-trained model, the training being based at least in part on one or more n-dimensional representations that are tagged as being associated with one or more threats and one or more n-dimensional representations that are tagged as being threat free.

Example T, the one or more non-transitory computer-readable media of any of Examples N-S, wherein the machine-trained model includes an artificial neural network and the training includes using machine learning.

What is claimed is:

1. A method of detecting malware, the method comprising:
   receiving, by a computing device, data from a data store;
   identifying, by the computing device, at least a first group of bits in the data and a second group of bits in the data;
   representing, by the computing device, a first set of bits in the first group of bits as a first coordinate for a first point and a second set of bits in the first group of bits as a second coordinate for the first point;
   representing, by the computing device, a first set of bits in the second group of bits as a first coordinate for a second point and a second set of bits in the second group of bits as a second coordinate for the second point;
   generating, by the computing device, an n-dimensional representation for the data based at least in part on the first point and the second point, the n-dimensional representation including at least three dimensions;
   processing the n-dimensional representation using an artificial neural network that has been trained using machine learning;
   detecting a threat based at least in part on the processing; and
   performing a threat operation to address the threat, the threat operation comprising at least one of removing the threat, preventing the threat from associating with the data, or providing a notification to another computing device regarding the threat.

2. The method of claim 1, further comprising:
   representing, by the computing device, a third set of bits in the first group of bits as a third coordinate for the first point.

3. The method of claim 2, wherein the first set of bits in the first group of bits comprises a first byte, the second set of bits in the first group of bits comprises a second byte that is directly adjacent to the first byte, and the third set of bits in the first group of bits comprises a third byte that is directly adjacent to the second byte.

4. The method of claim 1, wherein the data comprises file system data.

5. The method of claim 1, wherein the data comprises non-image-based data.

6. One or more non-transitory computer-readable media storing computer-executable instructions that, when executed, instruct one or more processors to perform operations comprising:
   obtaining data;
   determining a first coordinate for a first point based at least in part on a first set of bits in the data and determining a second coordinate for the first point based at least in part on a second set of bits in the data that is adjacent to the first set of bits;
   determining a first coordinate for a second point based at least in part on a third set of bits in the data and determining a second coordinate for the second point based at least in part on a fourth set of bits in the data that is adjacent to the third set of bits;
   generating an n-dimensional representation for the data based at least in part on the first and second coordinates for the first point and the first and second coordinates for the second point, the n-dimensional representation including at least three dimensions;
   processing the n-dimensional representation using an artificial neural network that has been trained with machine learning;
   detecting a threat based at least in part on the processing; and
   performing a threat operation to address the threat, the threat operation comprising at least one of removing the threat, preventing the threat from associating with the data, or providing a notification to a computing device regarding the threat.

7. The one or more non-transitory computer-readable media of claim 6, wherein the data comprises at least one of file system data, network traffic data, runtime data, or data associated with an isolated environment.

8. The one or more non-transitory computer-readable media of claim 6, wherein the first set of bits is directly adjacent to the second set of bits.

9. The one or more non-transitory computer-readable media of claim 6, wherein the operations further comprise:
   determining a type of the data; and
   determining to represent the data with a first portion of the data based at least in part on the type of the data, the first portion of the data including the first set of bits, the second set of bits, the third set of bits, and the fourth set of bits.

10. The one or more non-transitory computer-readable media of claim 6, wherein the operations further comprise:
    training the artificial neural network based at least in part on one or more n-dimensional representations that are tagged as being associated with one or more threats and one or more n-dimensional representations that are tagged as being threat free.

11. A system comprising:
    control circuitry; and
    memory communicatively coupled to the control circuitry and storing executable instructions that, when executed by the control circuitry, cause the control circuitry to perform operations comprising:
      obtaining data;
      determining a first coordinate for a first point based at least in part on a first set of bits in the data and determining a second coordinate for the first point based at least in part on a second set of bits in the data that is adjacent to the first set of bits;
      determining a first coordinate for a second point based at least in part on a third set of bits in the data and determining a second coordinate for the second point based at least in part on a fourth set of bits in the data that is adjacent to the third set of bits;
      generating an n-dimensional representation for the data based at least in part on the first and second coordinates for the first point and the first and second coordinates for the second point, the n-dimensional representation including at least three dimensions;
      processing the n-dimensional representation with an artificial neural network that has been trained based at least in part on machine learning;
      identifying a threat based at least in part on the processing; and
      performing a threat operation to address the threat, the threat operation comprising at least one of removing the threat, preventing the threat from associating with the data, or providing a notification to a computing device regarding the threat.

12. The system of claim 11, wherein the first set of bits is directly adjacent to the second set of bits.

13. The system of claim 11, wherein the operations further comprise:
   determining a type of the data; and
   determining to represent the data with a first portion of the data based at least in part on the type of the data, the first portion of the data including the first set of bits, the second set of bits, the third set of bits, and the fourth set of bits.

14. The system of claim 11, wherein the operations further comprise:
   training the artificial neural network based at least in part on one or more n-dimensional representations that are tagged as being associated with one or more threats and one or more n-dimensional representations that are tagged as being threat free.

15. The system of claim 11, wherein the operations further comprise:
   extracting a first portion of the data and refraining from extracting a second portion of the data, the first portion of the data including the first set of bits and the second set of bits.

16. The system of claim 11, wherein the data comprises non-image-based data.

17. The one or more non-transitory computer-readable media of claim 6, wherein the operations further comprise:
   determining a third coordinate for the first point based at least in part on a fifth set of bits in the data that is adjacent to the second set of bits,
   wherein the generating the n-dimensional representation is based at least in part on the third coordinate for the first point.

18. The one or more non-transitory computer-readable media of claim 17, wherein the fifth set of bits is directly adjacent to the second set of bits.

19. The system of claim 11, wherein the operations further comprise:
   determining a third coordinate for the first point based at least in part on a fifth set of bits in the data that is adjacent to the second set of bits,
   wherein the generating the n-dimensional representation is based at least in part on the third coordinate for the first point.

20. The system of claim 19, wherein the fifth set of bits is directly adjacent to the second set of bits.

\* \* \* \* \*